US008959529B2

(12) United States Patent
Nelson

(10) Patent No.: US 8,959,529 B2
(45) Date of Patent: *Feb. 17, 2015

(54) HIGH-PERFORMANCE VIRTUAL MACHINE NETWORKING

(75) Inventor: Michael Nelson, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,861

(22) Filed: Aug. 17, 2012

(65) Prior Publication Data

US 2012/0331250 A1    Dec. 27, 2012

Related U.S. Application Data

(63) Continuation of application No. 12/393,231, filed on Feb. 26, 2009, now Pat. No. 8,250,586, which is a continuation of application No. 10/383,702, filed on Mar. 7, 2003, now Pat. No. 7,620,955, which is a continuation-in-part of application No. 09/877,378, filed on Jun. 8, 2001, now Pat. No. 6,961,941.

(51) Int. Cl.
| G06F 3/00 | (2006.01) |
|---|---|
| G06F 9/455 | (2006.01) |
| G06F 9/54 | (2006.01) |
| G06F 9/48 | (2006.01) |

(52) U.S. Cl.
CPC .......... *G06F 9/45533* (2013.01); *G06F 9/546* (2013.01); *G06F 9/45504* (2013.01); *G06F 9/455* (2013.01); *G06F 9/4812* (2013.01); *G06F 2009/45595* (2013.01)
USPC ............................... 719/314; 718/1

(58) Field of Classification Search
CPC .............................. G06F 9/546; G06F 9/45533
USPC ....................................... 719/312, 310; 718/1
See application file for complete search history.

(56) References Cited

U.S. PATENT DOCUMENTS

| 4,564,903 A | | 1/1986 | Guyette et al. | |
|---|---|---|---|---|
| 4,654,654 A | | 3/1987 | Butler et al. | |
| 4,694,396 A | * | 9/1987 | Weisshaar et al. | ............ 719/313 |
| 4,835,677 A | | 5/1989 | Sato et al. | |
| 5,261,095 A | * | 11/1993 | Crawford et al. | ............ 717/149 |
| 5,452,462 A | | 9/1995 | Matsuura et al. | |
| 5,488,716 A | | 1/1996 | Schneider et al. | |
| 5,530,860 A | * | 6/1996 | Matsuura | ....................... 718/105 |

(Continued)

OTHER PUBLICATIONS

Andrew S. Tanenbaum, Distribured operating systems, 1986.*

(Continued)

*Primary Examiner* — Lechi Truong

(57) ABSTRACT

A method for conveying a data packet received from a network to a virtual machine instantiated on a computer system coupled to the network, and a medium and system for carrying out the method, is described. In the method, a guest receive pointer queue of a component executing in the virtual machine is inspected in order to identify a location in a guest receive packet data buffer that is available to receive packet data. Data from the data packet received from the network is copied into the guest receive packet data buffer at the identified location. A standard receive interrupt is raised in the virtual machine. Thus, the kernel places the data packet received from the network into a memory space accessible to the virtual machine without any intervention by a virtual machine monitor component of the virtualization software.

14 Claims, 4 Drawing Sheets

(56) References Cited

U.S. PATENT DOCUMENTS

| | | | |
|---|---|---|---|
| 5,825,649 A | 10/1998 | Yoshimura | |
| 5,913,058 A | 6/1999 | Bonola | |
| 5,953,520 A | 9/1999 | Mallick | |
| 5,961,642 A | 10/1999 | Lewis | |
| 6,075,938 A * | 6/2000 | Bugnion et al. | 703/27 |
| 6,085,120 A | 7/2000 | Schwerdtfeger et al. | |
| 6,115,779 A | 9/2000 | Haubursin et al. | |
| 6,128,316 A | 10/2000 | Takeda et al. | |
| 6,269,391 B1 | 7/2001 | Gillespie | |
| 6,269,409 B1 | 7/2001 | Solomon | |
| 6,370,614 B1 | 4/2002 | Teoman et al. | |
| 6,393,474 B1 | 5/2002 | Eichert et al. | |
| 6,412,035 B1 | 6/2002 | Webber | |
| 6,507,904 B1 | 1/2003 | Ellison et al. | |
| 6,519,594 B1 | 2/2003 | Li | |
| 6,665,302 B2 | 12/2003 | Lee | |
| 6,735,601 B1 | 5/2004 | Subrahmanyam | |
| 6,907,042 B1 | 6/2005 | Oguchi | |
| 6,907,600 B2 | 6/2005 | Neiger et al. | |
| 6,948,003 B1 | 9/2005 | Newman et al. | |
| 6,961,941 B1 | 11/2005 | Nelson | |
| 6,971,044 B2 | 11/2005 | Geng et al. | |
| 7,620,955 B1 | 11/2009 | Nelson | |
| 2002/0118644 A1 | 8/2002 | Moir | |
| 2002/0124108 A1 | 9/2002 | Terrell et al. | |
| 2002/0143842 A1 | 10/2002 | Cota-Robles et al. | |
| 2005/0175014 A1 | 8/2005 | Patrick | |
| 2006/0047665 A1 | 3/2006 | Neil | |
| 2009/0183180 A1 | 7/2009 | Nelson | |

OTHER PUBLICATIONS

Tanenbaum, Andrew S., Computer Networks, 3rd Edition, Prentice Hall PTR, 1996, pp. 195-213, 469-473, 523-525, 533-539, 562-585.

CHIA, Chao, Mach on a Virtually Addressed Cache Architecture, Jun. 1990.

* cited by examiner

HIGH-PERFORMANCE VIRTUAL MACHINE NETWORKING

CROSS-REFERENCE TO RELATED APPLICATIONS

This application is a continuation of U.S. patent application Ser. No. 12/393,231 filed Feb. 26, 2009, which is a continuation of 10/383,702, filed Mar. 7, 2003, now U.S. Pat. No. 7,620,955, which is a continuation-in-part of U.S. patent application Ser. No. 09/877,378, filed Jun. 8, 2001, now U.S. Pat. No. 6,961,941.

BACKGROUND OF THE INVENTION

1. Field of the Invention

This invention relates to virtualized computer systems, in particular, to a system and method for improving the performance of network transfers to and from a virtual machine.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer.

General Virtualized Computer System

As is well known in the field of computer science, a virtual machine (VM) is a software abstraction—a "virtualization"—of an actual physical computer system. FIG. 1 illustrates, in part, the general configuration of a virtual machine 200, which is installed as a "guest" on a "host" hardware platform 100.

As FIG. 1 shows, the hardware platform 100 includes one or more processors (CPUs) 110, system memory 130, and a storage device, which will typically be a disk 140. The system memory will typically be some form of high-speed RAM, whereas the disk (one or more) will typically be a non-volatile, mass storage device. The hardware 100 will also include other conventional mechanisms such as a memory management unit MMU 150, various registers 160, and any conventional network connection device 172 (such as a network adapter or network interface card—"NIC") for transfer of data between the various components of the system and a bus or network 700, which may be any known public or proprietary bus structure or local or wide-area network such as the Internet, an internal enterprise network, etc.

Each VM 200 will typically include at least one virtual CPU 210, a virtual disk 240, a virtual system memory 230, a guest operating system 220 (which may simply be a copy of a conventional operating system), and various virtual devices 270, in which case the guest operating system ("guest OS") will include corresponding drivers 224. All of the components of the VM may be implemented in software using known techniques to emulate the corresponding components of an actual computer.

If the VM is properly designed, then it will not be apparent to the user that any applications 260 running within the VM are running indirectly, that is, via the guest OS and virtual processor. Applications 260 running within the VM will act just as they would if run on a "real" computer, except for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes all the resources of the physical host machine. Among other components, the VMM therefore usually includes device emulators 330, which may constitute the virtual devices 270 that the VM 200 addresses. The interface exported to the VM is then the same as the hardware interface of the machine, so that the guest OS cannot determine the presence of the VMM.

The VMM also usually tracks and either forwards (to some form of operating system) or itself schedules and handles all requests by its VM for machine resources, as well as various faults and interrupts. A mechanism known in the art as an exception or interrupt handler 355 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Moreover, the various virtualized hardware components such as the virtual CPU(s) 210, the virtual memory 230, the virtual disk 240, and the virtual device(s) 270 are shown as being part of the VM 200 for the sake of conceptual simplicity—in actual implementations these "components" are usually constructs or emulations exported to the VM by the VMM. For example, FIG. 2 shows a virtual NIC 272 as being within the VM 200. This virtual component, which may be one of the virtual devices 270, may in fact be implemented as one of the device emulators 330 in the VMM. One advantage of such an arrangement is that the VMM may be set up to expose "generic" devices, which facilitate VM migration and hardware platform-independence.

Virtual and Physical Memory

As in most modern computers, the address space of the memory 130 is partitioned into pages (for example, in the Intel x86 architecture), regions (for example, Intel IA-64 architecture) or other analogous units. Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding PPN.) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 202, which translates the guest VPN (GVPN) into a corresponding guest PPN (GPPN) in the conventional manner; because the address offsets are the same, this is the same as translating guest physical addresses (GPAs) into actual physical (machine) addresses (PAs). The guest OS therefore "believes" that it is directly addressing the actual hardware memory, but in fact it is not.

Of course, a valid address to the actual hardware memory must ultimately be generated. A memory management module 350, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module 617 in the kernel 600, as illustrated in FIG. 2 and described further below), depending on the implementation: From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System Software Configurations in Virtualized Systems

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations of behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600 that serves as the system software for several VM/VMM pairs 200/300, ..., 200n/300n. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration. The invention described below takes advantage of the ability to optimize a kernel as a platform for virtual computers.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At boot-up time, an existing operating system 420 may be at system level and the kernel 600 may not yet even be operational within the system. In such case, one of the functions of the OS 420 may be to make it possible to load the kernel 600, after which the kernel runs on the native hardware 100 and manages system resources. In effect, the kernel, once loaded, displaces the OS 420. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In such implementations, the kernel 600 preferably also includes a remote procedure call (RPC) mechanism to enable communication between, for example, the VMM 300 and any applications 800 installed to run on the COS 420.

Actions

In kernel-based systems such as the one illustrated in FIG. 1, there must be some way for the kernel 600 to communicate with the VMM 300. In general, the VMM 300 can call into the kernel 600 but the kernel cannot call directly into the VMM. The conventional technique for overcoming this is for the kernel to post "actions" (requests for the VMM to do something) on an action queue 1360 (see FIG. 2) stored in memory 130. As part of the VMM code, the VMM looks at this queue 1360 periodically, and always after it returns from a kernel call and also before it resumes a VM. One typical action, used in this invention (described further below), is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue 1360. This may be done using known programming techniques.

Worlds

The kernel 600 handles not only the various VMM/VMs, but also any other applications running on the kernel, as well as the COS 420 and even the hardware CPU(s) 110, as entities that can be separately scheduled. In this disclosure, each schedulable entity is referred to as a "world," which contains a thread of control, an address space, machine memory, and handles to the various device objects that it is accessing. Worlds, represented in FIG. 1 within the kernel 600 as module 612, are stored in a portion of the memory space controlled by the kernel. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds.

Worlds preferably run at the most-privileged level (for example, in a system with the Intel x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

Switching Worlds

When the world that is running on a particular CPU (which may be the only one) is preempted by or yields to another world, then a world switch has to occur. A world switch involves saving the context of the current world and restoring the context of the new world such that the new world can begin executing where it left off the last time that it is was running.

The first part of the world switch procedure that is carried out by the kernel is that the current world's state is saved in a data structure that is stored in the kernel's data area. Assuming the common case of an underlying Intel x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding of the details of this process is not necessary for understanding the present invention, however, so further discussion is omitted.

Memory Management in Kernel-Based System

The kernel 600 includes a memory management module 616 that manages all machine memory that is not allocated exclusively to the COS 420. When the kernel 600 is loaded, the information about the maximum amount of memory available on the machine is available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600. Second, memory is used for the guest memory of the virtual machine. The memory management module may include any algorithms for dynamically allocating memory among the different VM's 200.

Interrupt and Exception Handling in Kernel-Based Systems

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600 therefore preferably also includes an interrupt/exception handler 655, that is able to intercept and handle (using a corresponding IDT in the conventional manner), interrupts and exceptions for all devices on the machine. When the VMM world is running, whichever IDT is currently loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt), which is described below. One example of when the VMM preferably calls the kernel, which then forwards an interrupt to the COS, would be where the interrupt involves devices such as a mouse, which is typically controlled by the COS. The VMM may forward still other interrupts to the VM.

Device Access in Kernel-Based System

In the preferred embodiment of the invention, the kernel 600 is responsible for providing access to all devices on the physical machine, in particular, to the NIC 172. In addition to other modules that the designer may choose to load into the kernel, the kernel will therefore typically include conventional drivers as needed to control access to devices. Accordingly, FIG. 1 shows within the kernel 600 a module 610 containing loadable kernel modules and drivers.

Conventional Networking and Packets

In conventional non-virtualized systems, data transfer between an application and various devices 400-1, 400-2, ..., 400-m often takes place over a shared or dedicated communication channel such as the bus or network 700. It is assumed here that data transfer between the system hardware 100 and each device 400-1, 400-2, ..., 400-m takes place in units such as "packets"; other types of devices may of course also be connected to the hardware 100, both directly and via the network.

Each device may be considered to be a separate "target" or "destination" when it comes to data transfer. A hardware device controller 175 is also typically included for each device, or for each group of devices that share the bus 700 and communicate using a common protocol. In FIG. 1, only one such device controller 175 is shown, merely for the sake of simplicity. A conventional driver is also loaded in the operating system in order to support the hardware controller 175.

Assume by way of a very common example that the devices 400-1, 400-2, 400-m are USB devices. Whenever some "source" sub-system or process, such as an application, initiates a request for transfer of a block of data D to a USB device, that is, an OUT operation, it establishes a buffer in memory 130 in which it stores the data D. The source sub-system then generates a corresponding transfer request to indicate to the controller's driver that it should begin the procedure (described below) for transferring the data set D. The buffer is also established for data that is to be input from the USB device that is, for an IN operation. Note that, in other systems, according to other protocols, the controller driver may be responsible for establishing the buffer.

The driver then splits the source's data request into sub-blocks whose size is chosen to be consistent with bus bandwidth requirements and bus (for example, USB) protocol mechanisms. For the sake of illustration, assume that the source data set D is subdivided into three sub-sets or "sub-blocks" D1, D2, and D3. In most practical cases, the number of sub-blocks will be much greater, depending on the size of the original data set D. Each sub-block D1, D2, and D3 is used as the basis for a single "transaction," which results in the data sub-block being transferred from the source's buffer to the USB device, or vice versa. The transfer procedure is typically the same regardless of the number of transactions.

The "raw" data sub-sets D1, D2, D3, etc., alone are generally not enough to adequately define the parameters of a desired transfer. Rather, each sub-set is usually included in or referenced by another data structure that also specifies such information as the destination, the direction of transfer (IN or OUT), the size of the data sub-set to be transferred, etc. In the USB context, the data structures used for this purpose are known as "transfer descriptors" (TDs). Similar descriptors are usually also created for data transfer using other protocols. Continuing with the example of transfer according to the USB protocol, the driver then builds a list of pending transactions that are targeted for one or more USB devices attached to the bus 700. Each TD defines one transaction. The TDs are also stored in memory, in particular, a TD buffer established for the purpose.

In USB-based systems, at a predefined interval, the controller 175 begins to take TDs as inputs, usually (but not necessarily) one at a time, and from each TD and its respective data sub-block creates a data structure known as a "packet." The controller then transfers the packets sequentially to the bus 700 via a hub (not shown). The concept of a "packet" has somewhat varying definitions in the literature, but is used here to refer to the data structure(s) used to transfer a single data sub-block D1, D2, and D3 to or from at least one destination (usually, a device) via the bus.

In order to guarantee data delivery, during a "handshake" packet phase, the target device returns to the sender (here: controller 175) information in the form of a packet indicating whether the transaction was successful, whether it failed, or whether the intended target device was busy. If no signal is transmitted back to the controller within a predetermined time, then the controller assumes that the packet transfer failed. In the case of a failed packet transfer, assuming any information is returned at all, the returned information normally includes at least the number of bytes that transferred successfully before the failure, and also usually a flag indicating what the error was. In the case of a busy device, the controller typically attempts to resubmit the packet, and may continue to do so until the transfer is success or fails.

Input of data from a device, that is, an IN operation, is also carried out in the form of packets, with the same protocol. As with OUT operations, TDs are generated that define the destination, buffer address, etc. of a data sub-set, but the result of transmission of a packet derived from such a TD is that the data sub-set is input from the destination and placed in the buffer. In short, input of a packet of data is handled in essentially the same manner as packet output, with the obvious difference that the direction in which the corresponding data sub-set is transferred is the opposite. Note that information (in particular, at least one TD) is transmitted from the initiating component to the network (and on to the target device) for both IN and OUT operations.

Conventional Networking in Virtualized Systems

The description above relates to conventional computer systems, but applies also, with some extensions, to virtualized computer systems that run as "guests" on an underlying "host" hardware and software platform. According to the prior art, packet-based data transfer between a source (such as one of the applications 260) within the VM and a physical device (destination) is essentially the same as described above in the non-virtualized context, with the exception that the transfer is "duplicated": The source data block D is first transferred (usually, copied) from the transfer-requesting source process into a buffer, which is normally established by the source process itself (the normal case) but could alternatively be established by a driver installed in the guest OS 220. This "guest" driver, which is analogous to (and in many cases an identical copy of) the driver in the actual, "host" OS, then builds a list of TDs from the buffered data and stores the TDs in the VM's memory space.

A virtual device controller (a software analog of the controller 175) then constructs packets from the TDs and corresponding data sub-blocks, and passes them sequentially to what it "believes" is a bus. In fact, however, the VM-issued packets are received (in particular, intercepted) by an emulated bus within the VMM. The VMM in turn passes each VM-issued packet to the system software and hardware, which places the (or a corresponding) packet on the "real" bus 700. Note that the device to which (or from which) the packets are to be sent (or received) is typically one of the physical devices 400-1, 400-2, ... , 400-m, although these may also be emulations.

As can be understood from the discussion above, with respect to packet-based transfer, the VM is designed and intended to act just like a conventional non-virtualized system, the major structural difference being that the various hardware components involved, including the controller and the bus, are implemented in software. Again, with respect to packet transfer, the VM/VMM interface is essentially a software "copy" of the hardware 100/bus 700 interface.

Shortcomings of the Prior Art

A well known goal of all networking is increased transfer speed. Unfortunately, the known method for VM networking described above has several structural and procedural features, each of which introduces delay. Delay is caused, for example, by each of the following:

1) transitions within the host systems for both transmitting and receiving;
2) transitions between the VM and the VMM;
3) transitions between the VMM and the kernel; and
4) the need to copy data.

What is needed is a way to provide faster network I/O to and from a VM by eliminating some, and preferably all, of the causes of delay listed above. This invention provides a system configuration and method of operation that accomplishes this goal.

SUMMARY OF THE INVENTION

The invention provides a method for transferring (transmitting and/or receiving) a data set between a virtual computer and a destination over a network as a sequence of packets. The virtual computer runs on a "real" (physical) host computer, which includes both conventional system hardware and system software. The system hardware thus includes a memory, which has a physical address space, and a physical network interface device. The virtual computer includes a virtual network interface device, to which it issues packets to be transferred according to a protocol in which the packets are transferred individually as units.

According to the invention, a region in memory is mapped as a shared memory region, which lies within the addressable memory space of both the virtual computer and the system software. A plurality of pending packets issued by the virtual computer are simultaneously stored in the shared memory space. In the most common anticipated implementation of the invention each packet has a guest packet address and packet data, the packet data of at least one of the packets being a sub-set of the data set to be transferred.

Upon occurrence of a transfer request, the plurality of pending packets is transferred between the shared memory space and the network via the physical network interface device. In other words, transmit and/or receive packets are clustered before being sent on the physical network interface device for actual transfer over the network.

In the preferred embodiment of the invention, the virtual computer comprises a virtual machine (VM), which includes a guest operating system (OS), and a virtual machine monitor (VMM), which forms an interface between the VM and the system software. The VM has a guest address space, such that each guest address corresponds to a physical address. The transfer request is preferably generated from within the VM, preferably by a driver installed in the guest OS, and is detected in the VMM.

One way to generate the transfer request is as a trap into the VMM, which may be deferred until the occurrence of a triggering event. One such triggering event is receipt by the virtual network interface device of an acknowledgement signal generated by the destination acknowledging transfer of at least one earlier transferred packet; in other words, a current transfer is initiated upon acknowledgement of the previous transfer.

In order to avoid packets waiting too long for the acknowledgement signal to arrive, the rate of transmission of the pending packets by the physical network interface device may also be determined. As long as this rate is less than a predetermined minimum, pending packets may be transferred from the shared memory space to the network as soon as the pending packets are placed in the shared memory space. In other words, transmit and receive clustering may be turned off if actual transfer is found to be too slow and turned back on when the transfer rate is acceptably fast.

Another possible triggering event is that the number of pending (unprocessed) packets exceeds a predetermined maximum; the number may be either counted or estimated. One way to estimate how many packets are pending is by determining the how long it has been since the most recent receipt by the virtual network interface device of an acknowledgement signal; the triggering event is then the time since the most recent receipt exceeds a predetermined maximum.

The invention provides for clustering of both transmit and receive packets. In the context of transmits, the packet data of the pending packets are stored at the respective guest packet addresses in the shared memory region; guest address pointers to the pending packet's packet data are also stored in the shared memory region. When the transfer request is detected, the physical address(es) at which the packet data is stored are passed to control software of the physical network interface device; the physical network interface device can then transfer the pending packets between the VM and the destination using its conventional procedure. Depending on the system software, it is also possible according to the invention to combine all the pending packets into a single contiguous packet and then to pass the physical address of the single packet to the control software of the physical network interface device.

When the transfer request is detected, the VM is preferably prevented from VM from modifying the guest address pointers and the packet data for the stored, pending packets. The guest address to which each guest address pointer points is then translated into the corresponding physical address. After completed transfer by the physical network interface device of the packets pointed to by the guest address pointers, the VM's ability to modify the guest address pointers and the packet data may then be restored.

According to one refinement of the invention, a portion of the guest memory space sufficient to hold a maximum number of pending transmit packets is pre-allocated. The guest address pointers are then initialized to point into the pre-allocated portion of the guest memory space and a mapping is pre-computed of each address contained in the guest address pointers from the guest memory space to the physical memory space.

In the context of receiving packets, the invention provides, in the shared memory region, a guest receive pointer queue that stores guest address pointers that point into a guest packet data buffer, which has storage locations for respective received packet data sub-sets. Data from a plurality of packets received from the physical network interface device is copied into respective available storage locations in the guest receive packet data buffer. An interrupt is then issued to the VM, which then dismisses the interrupt and processes the received packets.

As with transmit clustering it is possible to delay issuing the interrupt to the VM until the number of unprocessed received packets exceeds a predetermined maximum. Alternatively, the longest time any currently pending, unprocessed packet has been in the guest receive packet data buffer can be measured and the interrupt may be delayed until this time exceeds a predetermined maximum; in other words, packets may wait for processing, but not for more than some maximum time.

The invention also provides a mechanism for offloading interrupts in a system that includes multiple processors (CPUs); a programmable interrupt control sub-system; a system software kernel that has a kernel interrupt handler; and a destination entity that is running on a first one of the CPUs, which forms a destination CPU, and that has a destination interrupt handler.

According to this aspect of the invention, the kernel selects a second one of the CPUs—preferably an idle or at least most idle CPU—as a local CPU. The kernel also sets the programmable interface control sub-system to forward interrupts from a source entity (such as a device, in particular, the physical network interface device) to the local CPU, such that the local CPU calls the kernel interrupt handler upon receipt of interrupts from the source entity. Any interrupt raised by the source entity is sensed by the programmable interface control sub-system, which then causes the kernel interrupt handler to be called by the local CPU. The kernel then sends an interrupt vector to the destination CPU—the interrupt vector contains information for directing the destination CPU to call the destination interrupt handler.

As a further aspect of interrupt offloading according to the invention, execution of destination entity instructions is allowed to proceed uninterrupted on the destination CPU during the time from sensing the interrupt raised by the source entity at least until the time the interrupt vector is received by the destination CPU.

In the preferred embodiment of the invention, the interrupt vector forms an index into an interrupt descriptor table (IDT) and identifies an entry in the IDT that points to the location of a predetermined interrupt-handling routine in the destination interrupt handler. Also in the preferred embodiment of the invention, the destination entity is a virtual computer that includes a virtual machine (VM) and a virtual machine monitor (VMM); the VMM forms an interface between the VM and the destination CPU and exports a hardware interface to the VM; and the destination interrupt handler is in the VMM.

In a preferred implementation of the invention, the source entity is a network interface device; the programmable interrupt control sub-system comprises a CPU interrupt controller for each CPU and an I/O interrupt controller; and the I/O interrupt controller senses the occurrence of the interrupt raised by the source entity and the CPU interrupt controller of the destination CPU senses the interrupt vector.

DETAILED DESCRIPTION

In broadest terms, two features of the invention enable it to overcome the delay-causing disadvantages of the prior art. First, to eliminate the need for host transitions, NIC drivers (one or more, depending on the number of NICs included) are installed and run within the kernel 600. This allows all networking to be done by direct kernel interactions. Second, a novel virtual networking interface is provided that minimizes and, in some cases eliminates, the need for VM-to-VMM and VMM-to-kernel transitions, as well as the need to copy data. The interface according to the invention has the added advantage of simplicity and thus avoids the complexity of emulating a standard interface. These features of the invention are described below in greater detail.

In the description of the invention below, it is assumed that the system hardware 100 has the Intel x86 architecture only because this is the platform on which the ESX Server product of VMware, Inc., currently runs and it is the ESX Server in which a prototype of the invention has been implemented and tested. The mechanisms provided by the invention are not specific to the x86 architecture, however. Those skilled in the art of operating systems-level programming will know how to adapt the embodiment of the invention described below for use with other architectures.

The invention involves a system and method for transferring a data set over the network according to any protocol in which the data set is converted into a sequence of data sub-sets that are transferred as units. According to the common USB protocol, these sub-sets are referred to as "packets." For the sake of simplicity, the term "packet" is used below to refer to any data sub-set transferred as a unit over the network, regardless of the protocol.

Figure 1:
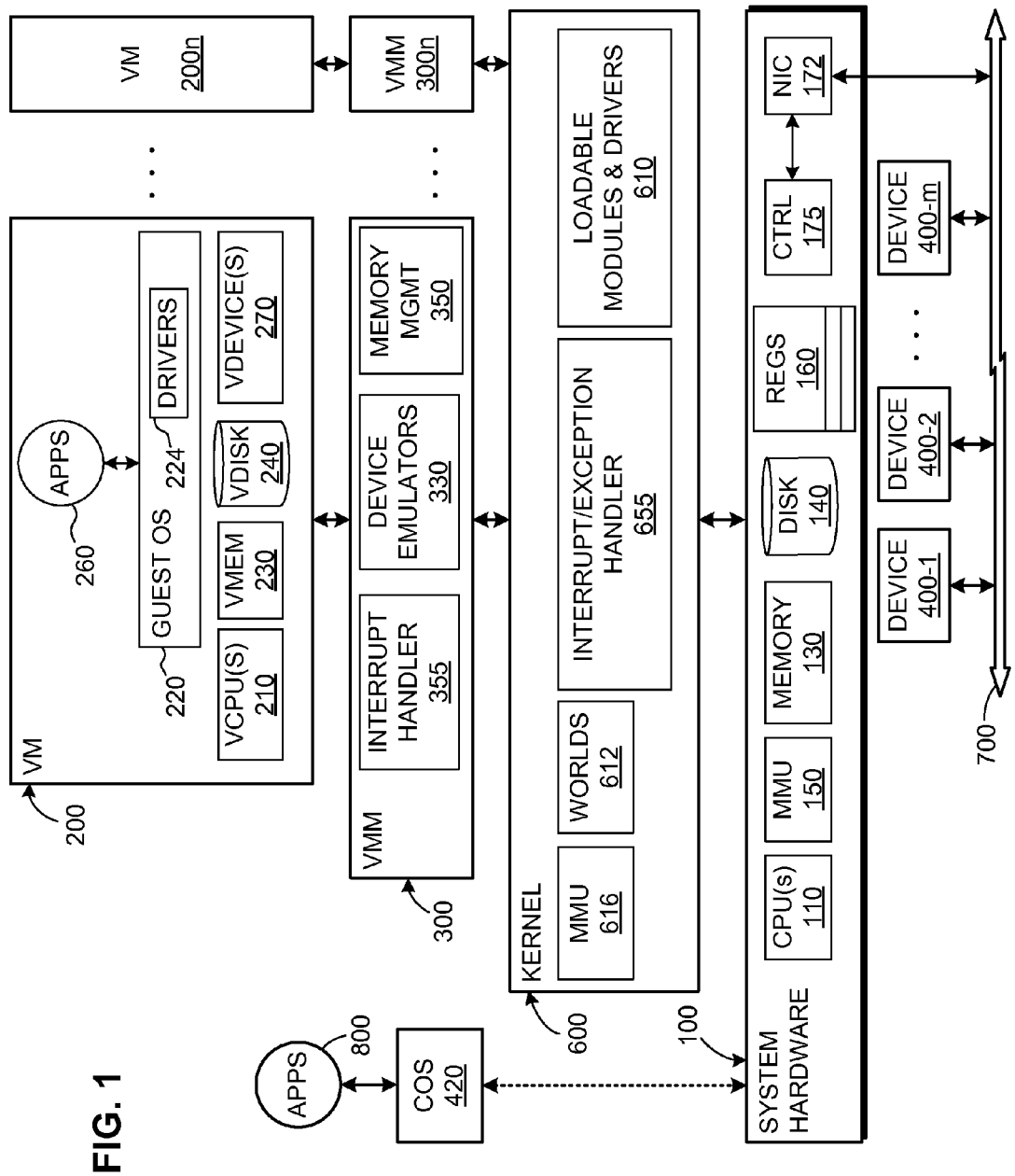
FIG. 1 illustrates the main components of kernel-based, virtualized computer system.

The unique components of the VM networking system according to the preferred embodiment of the invention are illustrated in FIG. 1. Various hardware and software components shown in FIG. 1 are omitted in FIG. 2 merely for the sake of simplicity and clarity; those skilled in the art of networking software will realize which of these standard components will be used by the invention. Also for the sake of simplicity, the device(s) are labeled collectively with the number 400. Moreover, the memory 130 is shown separated from the other system hardware 100 merely to make it easier to describe certain structures used by the invention.

The unique features of the invention are the following:
 a driver ("vmxnet driver") 225 that runs in the guest (VM 200) and an emulation component ("vmxnet emulation") 360 that runs in the VMM 300; As will become clearer below, the driver 225 and the emulation component 360 form, in cooperation, a virtual networking interface that the VMM emulates for the guest (VM 200);
 an implementation component ("vmxnet implementation") 611 that runs in the kernel 600;
 a shared memory region 132 (both FIG. 2 and FIG. 3) that is mapped as shared between the vmxnet driver, the VMM 300 (and thus available to the emulation component 360), and the kernel 600 (and thus available to the implementation component 611); and
 the physical NIC driver 614, which, according to the invention, is loaded in and runs in the kernel 600.

Other than the memory 130, all of these features are software and as such are instructions that are either stored on the disk 140 or are loaded into the system memory 130 for execution by the processor(s) 110. The VM 200 also includes (or the VMM exports) a virtual NIC 272, which any source within the VM "believes" is the device handling network transmission. In reality, of course, the physical NIC 172 performs this function. The design and operation of virtual components such as the virtual NIC 272 are well understood in the art.

Figure 3:
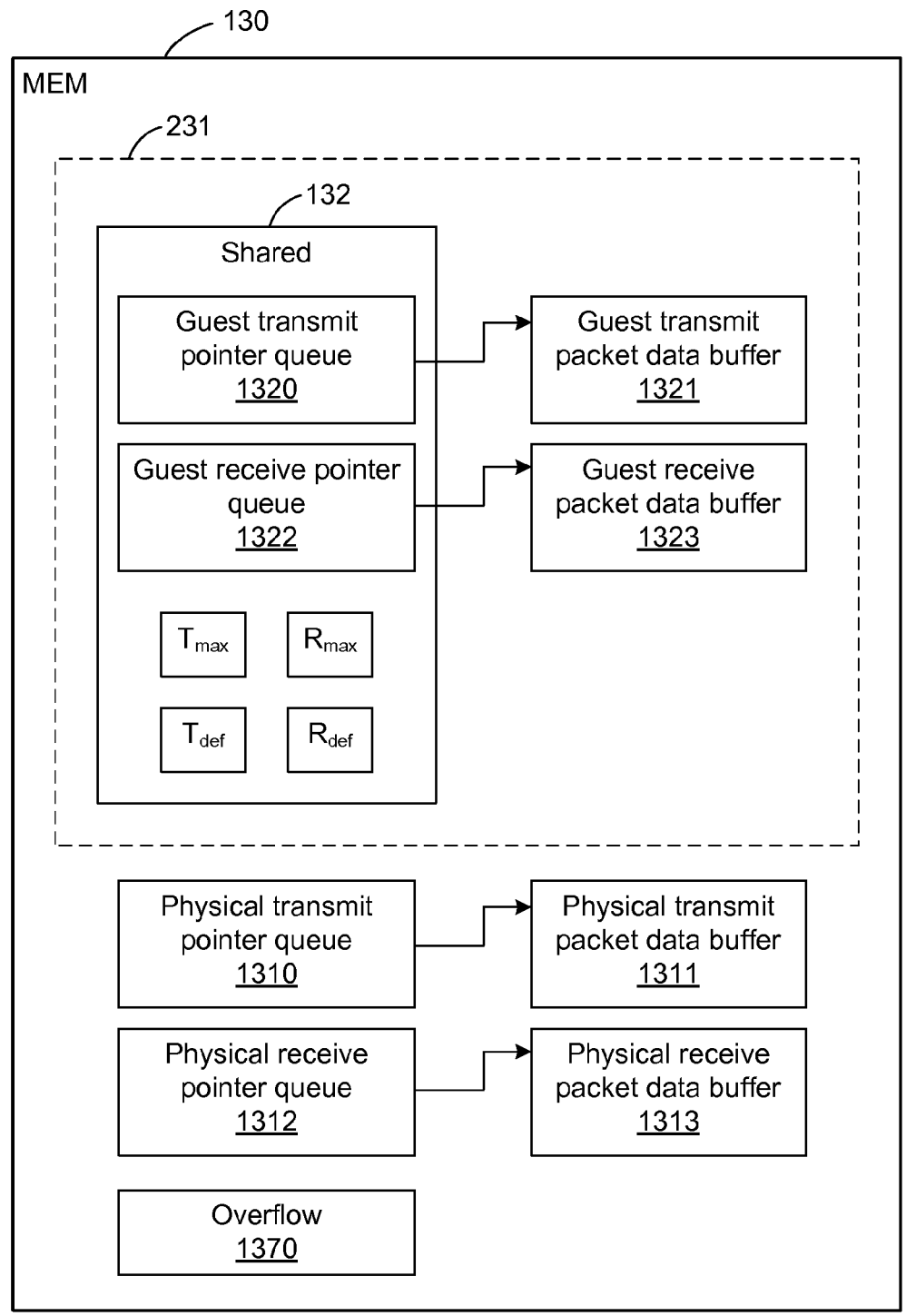
FIG. 3 illustrates various memory data structures used in the invention.

FIG. 3 illustrates various structures that are stored in the memory 130 for use by the invention. These structures include:
 a guest transmit pointer queue 1320 and a guest receive pointer queue 1322;
 a guest transmit packet data buffer 1321 and a guest receive pointer queue 1322;
 a physical transmit pointer queue 1310 and a physical receive pointer queue 1312;
 a physical transmit packet data buffer 1311 and a physical receive pointer queue 1313;
 an optional overflow queue 1370; and
 optional parameters $T_{max}$, $T_{def}$, $R_{max}$, and $R_{def}$, whose purpose is explained below.

The shared memory portion 132, as well as the guest packet data buffers 1321, 1323, lie within the guest physical address space, that is, in the space allocated for the virtual memory 230. In FIG. 3, this space is shown within the dashed line 231. As is discussed above, whenever an entity in the VM needs to access memory within this space, it uses either a guest PPN directly, or a guest VPN, which the guest OS maps to a guest PPN. Of course, the guest physical address space 231 resides in the actual machine memory 130 and, as such, is ultimately always accessed using actual (machine) physical addresses.

Some map of guest virtual addresses (page numbers) to guest physical addresses (page numbers) will also be needed in most embodiments of the invention.

Figure 2:
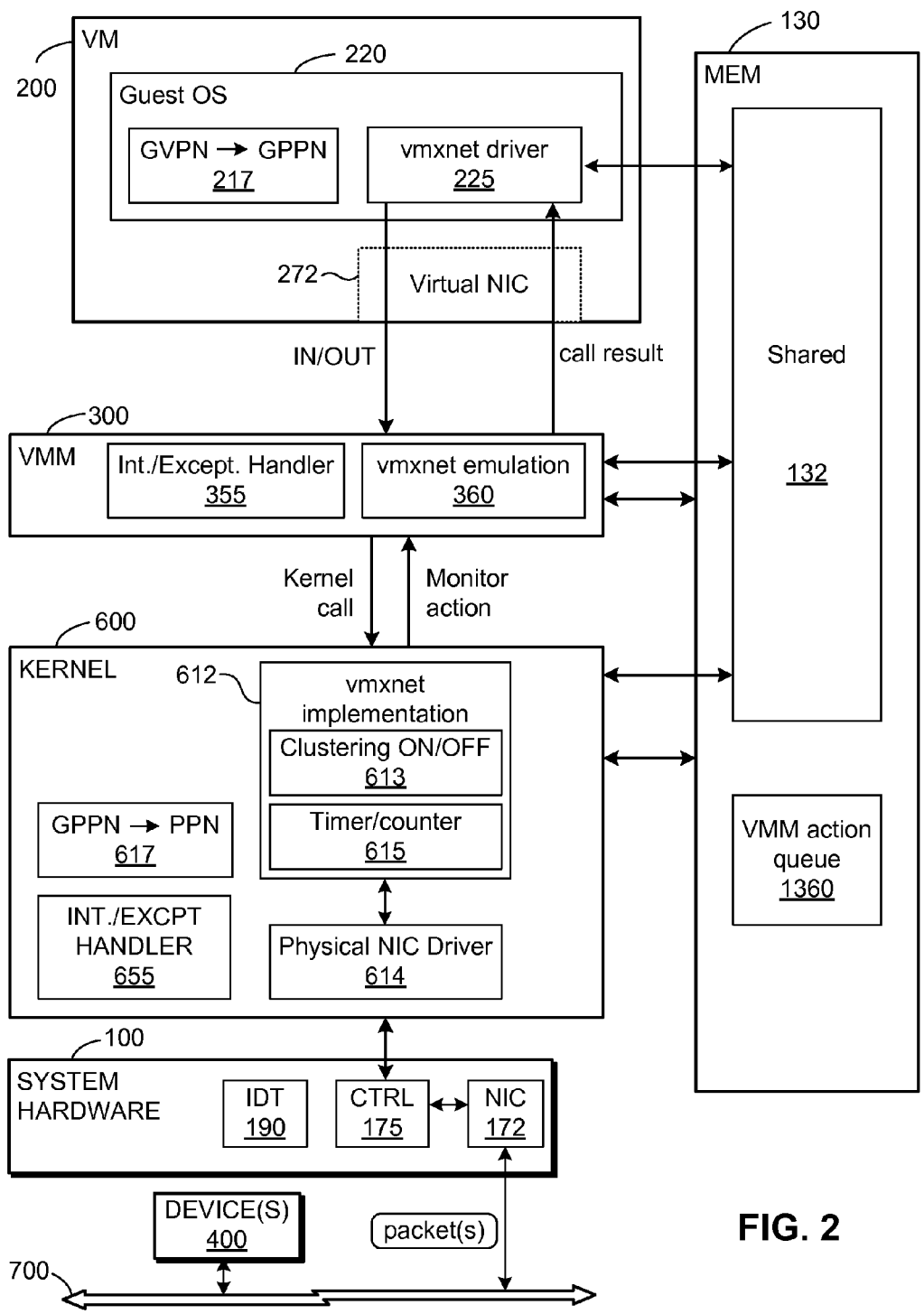
FIG. 2 illustrates the components and control flow in the VM networking system according to the invention.

Both Linux and Windows operating systems provide functions to accomplish this mapping within the guest VM. For efficiency when the guest OS is a version of Windows, however, the vmxnet driver 225 preferably precomputes the GVPN-to-GPPN mapping, which is illustrated in FIG. 2 as map 217.

The vmxnet driver 225 then calls the VMM 600 with the GPPNs for the structure 132. The driver 225 also preferably fills in receive buffer pointers inside of the shared data structure 132 and, in the case of non-zero-copy transmits in Windows (see below) also fills in the transmit buffer pointers. The kernel 600 then creates corresponding a GPPN-to-PPN map; this map will typically be a part of the general memory map 617 the kernel keeps for the VM, although this is not necessary.

The entries in the guest pointer queues 1320, 1322 are GPPNs that point to respective entries in the buffers 1321 and 1323. What this means is that the vmxnet driver 225 can access all of the structures within the guest memory space 231 using GPPNs alone. In order for the kernel 600 to access the shared memory structures or the guest transmit/receive packet data buffers, it must have the corresponding PPNs (machine). The kernel 600 gets these required PPNs by consulting the GPPN-to-PPN memory map it has earlier established for these structures.

The remaining memory structures shown in FIG. 3—the physical pointer queues 1310, 1312, the physical packet data buffers 1311, 1313, and the overflow queue 1370, lie outside the guest address space 231 of the VM, but can be accessed by the VMM and kernel using actual physical (machine) addresses.

The uses of these various memory structures are explained below.

As with any other networking system, the invention must provide for two main operations, namely, transmits and receives between some source entity or component and some destination entity or component. In this invention, the source entity or component is anything within the VM 200 that needs to communicate over the network 700. The designation "source" does not imply that it is this component that is sending data blocks to some remote device such as a printer (although this is of course the case for transmits), but rather that it is the source or initiator of the network transaction, regardless of whether this is an IN or an OUT. Similarly, "destination" does not necessarily mean that the entity or component referred to is the recipient of a data set sent by the source, but rather merely that it is the entity or component with which the source wants to communicate via the network; in other words, the destination is simply the source's counterpart in a network transaction. The two principle network operations—transmit and receive—will now be described separately.

Consider now the way in which the kernel 600—or any standard operating system—handles packet transmission and reception, even in systems with no virtual machine. For each packet to be transmitted, the packet data is stored beginning at an address in the physical transmit packet data buffer 1311. The physical transmit pointer queue 1310 then contains an entry that points to (gives the address of) the packet data; in other words, the physical transmit pointer queue 1310 is a queue of address pointers that direct the NIC controller 175 to the data of the packets to be transmitted. For each packet to be received, an entry in the physical receive pointer queue 1312 contains the address of an available space in the physical receive packet data buffer 1313 in which incoming packet data can be stored.

The pointer queues 1310 and 1312 are commonly implemented as first-in-first-out (FIFO) linked list, with the "last" element linked to the "first," so that each queue forms a "ring" buffer. Any other known data structure may of course be used instead to perform the same function.

Trapping

For both packet transmits and receives, the vmxnet driver 255 needs to cause the VMM to perform certain tasks. On the other hand, the VMM is preferably transparent to the VM. The question is then how the driver (a VM component) is to call into the VMM, that is, how to generate some form of transfer request that the VMM can sense and act on, but without the VM needing to "know" about the underlying VMM. In this invention, this is preferably done using the well-known technique of "trapping": The driver 225 does something that causes an exception, which will be detected and handled by the VMM's interrupt/exception handler 355; here, handling the exception means executing the instructions that are needed to perform the transmit and receive operations explained below.

In the preferred embodiment of the invention, the driver causes an exception by issuing protected instructions, that is, instructions that require a higher privilege level than the driver 225 (a user-level guest component) is at. IN or OUT operations are suitable for this purpose: an IN or OUT will cause a protection violation that will cause the CPU 110 to raise an exception, which will in turn be taken and handled by VMM's interrupt/exception handler 355. Using IN and OUT operations to enable the VM to trap (in this case, to "call") into the VMM is preferred because this is a common operation performed by conventional device drivers. Any other known mechanism may be used, however, to allow the vmxnet driver 225 to cause an exception that the VMM can trap and act on.

Transmits

Basic Transmit Path

Assume that an entity within the VM 200 (either an application 260 or the guest OS 225 itself) wishes to send or receive information over the network 700 and that the information is transferred in units such as packets. The simple transmit path used in the preferred embodiment of the invention is the following:

1. The guest OS 220 calls the vmxnet driver 225 with a network packet in the conventional manner.

2. The vmxnet driver 225 puts the guest physical address (es) of the packet data into the next free entry(-ies) in the guest transmit pointer queue 1320. If there is no room in the queue 1320, then the driver 225 tells the guest OS 220 to stop sending data, using standard signals.

3. The vmxnet driver 225 does an IN operation, which is trapped using known mechanisms by the vmxnet emulation module 360 in the VMM 300.

4. The VMM 300 calls into the vmxnet implementation module 611 in the kernel 600 to transmit the packet located at the address in the guest transmit data buffer 1321 to which the pointer queue 1320 entry points. The VMM returns the result of the kernel 600 call to the driver 225 as the result of the IN operation. Note that the result of the transmit returned to the virtual NIC 272 by the VMM will be consistent with the result returned to the physical NIC 172 by the destination device, except in rare cases such as hardware failure of the physical NIC. Even in such a case, however, the consequence would simply be that the guest OS would interpret any such packets as having been dropped; all standard networking code is written to deal with such packet drops.

5. Using known mechanisms, the kernel then 600 takes ownership of the pointer queue 1320 entry that contains the packet address so that it cannot be reused until the physical NIC 172 has transmitted the packet. Here, "ownership" means the exclusive right to modify the entry. Note that this is an instance of both the guest (VM) and the host (kernel) accessing the shared memory region 132.

6. Recall that the guest transmit pointer queue 1320 entries are the GPPNs of the corresponding entries in the packet data buffer 1321. For the kernel 600 to locate a packet in the machine address space, as it must, it takes the entry (GPPN) in the pointer queue 1320, which the kernel gets from the VMM, and then consults its GPPN-to-PPN map to find the actual (machine) physical address (PA) of the packet data in the data buffer 1321. The kernel 600 then gives the physical address of the packet data to the physical NIC 172, that is, to its controller 175. Note that it is not necessary for the kernel to copy the packet information into its own physical transmit packet data buffer 1311—the controller 175 will have the physical (machine) address of the packet data in the guest transmit packet data buffer 1321 and can read the data directly from that guest buffer 1321.

7. When the physical NIC 172 is done with the packet, the kernel 600 gives ownership of the corresponding pointer queue 1320 entry back to the driver 225.

8. The kernel 600 tells the VMM 300 to interrupt the VM 200 if the VM has stopped sending packets because there is no free space in the pointer queue 1320 (see step 2 above) or if it has been too long since the VM has been given a chance to process transmitted packets.

Note that this arrangement according to the invention needs only one trap to the VMM, via the IN operation, to send a packet.

One advantage of virtualization systems such as those made by VMware, Inc., is that the guest OS 220 may be a conventional, commodity OS such as the different versions of Microsoft Windows and Linux. Of relevance to this invention, in particular, to step 2 above, is that both Windows and Linux provide drivers that support zero-copy transmits and that may be used as the guest driver 225.

In Linux, the driver is given a single virtual address for the packet data and a simple masking operation is used to translate from a virtual address to a physical address; this feature may be used for packet address translation. Note, however, that the GPPN-to-PPN translation is also a fast operation in the kernel 600 because only a single physical address is involved (offsets are invariant). Nonetheless, when the guest OS 220 is Linux, it will typically be slightly faster to allow the driver 225 to handle translation through mapping, thereby avoiding altogether the need to copy the untranslated (guest physical) packet address into the buffer 133.

In contrast, in systems where the guest OS 220 is a version of Windows, it will usually be more efficient to copy the whole packet: In Windows, packets are fragmented into several pieces. In order to do a zero-copy transmit, the vmxnet driver 225 must ask Windows to give it the guest physical addresses (GPPNs) for each piece of the packet and then pass this list of GPPNs to the kernel 600. In order to copy the packet, the driver 225 must ask Windows to give it the virtual address of each piece of the packet. It can then take these virtual addresses and copy the packet into a single contiguous packet and then send down to the kernel 600 a single guest physical address for the packet. Throughput benchmarks show that, at least at present, copying is faster than not copying in Windows-based systems.

Additionally, in Windows-based systems, copying can be made faster than not copying because of certain optimizations provided by this invention. When copying, the driver 225 preferably pre-allocates enough memory to hold the maximum number of outstanding, pending transmit packets. Each pointer queue 1320 entry is then a (guest physical address pointer) into this pre-allocated memory. For an Ethernet network, for example, the MTU ("Maximum Transmission Unit"—the limit on the size of data sent over a network; the MTU is typically a property of the physical network interface) is 1514 bytes, so that one page is allocated for every two packets; packets are thus guaranteed not to cross a page boundary. Each entry in the guest transmit pointer queue 1320 is then preferably initialized to point into the pre-allocated memory space. After the memory is allocated, the VMM 300 is called by the vmxnet driver 225 via an OUT operation to pin all of these pages, using conventional mechanisms. The kernel 600 is then called to pre-compute the GPPN-to-PPN mapping for each packet. The result is that the kernel 600 has to do very little work during a packet transmit since no further guest-to-physical (machine) memory translations will be required.

Whether zero-copy transmit is provided by the operating system will also affect when the guest transmit and receive packet data buffers are created, and how: If zero-copy transmit is not provided, then the vmxnet driver 225 preferably creates the structures 132, 1321 and 1323, for example, when the vmxnet driver 225 is loaded into the guest OS 220. Where the guest OS does provide for zero-copy transmits, however, the transmit buffer 1321 will normally be given to the driver 225 by the guest OS 220; the driver 225 then gives the buffer back after the transmit completes to the physical NIC 172.

Where the guest OS is Linux, the receive buffer 1323 is created when needed by the driver 225 calling a Linux buffer allocator. After the driver receives the needed buffer, it passes it to the guest OS 220. In systems where the guest OS is a version of Windows, the driver 225 preallocates any needed receive buffer, such as buffer 1323.

Transmit Clustering

Streaming is generally done using TCP/IP (Transmission Control Protocol/Internet Protocol). With this protocol, an acknowledgement packet is sent to the data sender after a number of packets is sent. The result is that there are receive interrupts that are processed very frequently by the kernel 600 while the VM is streaming data out at relatively high data rates. The invention takes advantage of these receive interrupts to implement "transmit clustering."

The idea behind transmit clustering is that the guest (VM 200), in particular, the vmxnet driver 225, puts packet address information in the pointer queue 1320, but does not immediately call the VMM to transmit the packets. Rather, packets are transmitted in groups—clusters—upon the occurrence of a triggering condition. A preferred triggering condition is such that queued packets are transmitted for the virtual NIC 270 when the next packet is received on the virtual NIC. Because packets are typically received very frequently, transmits can generally be done without any driver-to-VMM traps and without any VMM-to-kernel 600 calls.

The invention provides alternative mechanisms for implementing transmit packet clustering. One other way, for example, is for the guest (in particular, the vmxnet driver 225) to determine that it has too many packets in its transmit pointer queue 1320 that the kernel 600 has not taken ownership of yet. Recall that packets are returned to the sender to acknowledge transmission of packets sent. One way to determine that too many packets are "waiting" or "queued" is therefore for the VMM to detect that it has been too long since receive interrupts have occurred.

What is "too long" can be determined as a function of the number of queued packets, for example, when the number of transmitted packets that have not been sent exceeds a predetermined maximum. When this threshold is crossed, the VMM calls the kernel 600 to transmit all pending packets in the transmit pointer queue 1320. In one prototype of the invention, for example, the threshold value for triggering the kernel to transmit pending packets was ten pending packets.

In the preferred embodiment of the invention, the number of currently queued packets is tracked as follows, which also further clarifies that is meant by "too long":

When the kernel 600 turns clustering ON (see below), it sets a maximum number $T_{max}$ of queued transmit packets in the shared memory data structure. The number $T_{max}$ is a configuration parameter that can be determined using conventional design criteria, and may be made adjustable by a system administrator using known techniques. In a prototype of the invention, for example, the parameter had a default value of ten queued packets ($T_{max}=10$).

The vmxnet driver 225 inspects this value $T_{max}$ to decide if it should send packets by trapping to the VMM 300 (see above) or if it should simply put the packet address (pointer) in the transmit pointer queue 1320 and continue with other tasks. Each time the vmxnet driver 225 puts a packet in the transmit pointer queue 1320 without trapping to the VMM to send the packet, it increments a count $T_{def}$ of deferred transmits. The vmxnet driver 225 preferably includes a comparison routine such that, when this count exceeds the transmit cluster max count ($T_{def} > T_{max}$), the vmxnet driver 225 calls the VMM. Whenever the kernel 600 transmits packets out of the transmit pointer queue 1320 it resets $T_{def}=0$. Note that, because $T_{def}$ is in the shared memory region 132, the vmxnet driver 225 can increment $T_{def}$ with no need for any call to the kernel 600.

In the TCP/IP case, having too many pending packets should not happen very often. However, it will probably happen more often where the UDP (User Datagram Protocol) is used because there may then not be many packets that the VM receives.

An alternative way to cluster packets to be transmitted is as a function of time, which may be measured using a known timing routine 615, preferably in the kernel 600. If more than a predetermined threshold time (for example, 10 milliseconds) has elapsed since the last packet was received on the virtual NIC 272 and there are pending packets to transmit, then the timer 615 will expire. Note that the kernel 600 will know when the virtual NIC 272 last got a packet because the kernel is the component that put it there. The kernel then interprets expiration of the timer as a signal to transmit the packets. This case should also happen only rarely.

Transmit clustering is turned ON by the kernel 600 (preferably, as a routine 613 in the implementation module 612) when it determines that the rate of packets being transmitted during a predetermined period is high enough and is turned OFF when the rate of packets being transmitted is too low. Transmit clustering cannot be ON all of the time because it will have a negative impact on network performance. For example, if clustering is ON all of the time, and there is no network traffic (no incoming packets) then even a single ping (transmission of a single packet) by the VM will sit in the transmit queue 1320 until the maximum permitted (threshold or "time-out") time has run out because there will be no received packet to trigger the transmit. In a prototype of the invention, this threshold was ten milliseconds, which is far too long to wait to transmit a single packet.

Whether clustering should be activated may also be determined using different types of predetermined thresholds, either packet-based or time-based or both: In one prototype of the invention, for example, transmit clustering was activated (turned ON) when at least 4000 packets were transmitted on average per second, measured over a 30 millisecond interval (thus, 120 packets must be transmitted in the interval); clustering was turned OFF when fewer than 3000 packets were transmitted on average per second, measured over a 30 millisecond interval (90 packets transmitted in the interval). These numbers—representing "high enough" and "too low"—are of course examples, and may be adjusted and optimized using conventional techniques of performance analysis.

Hardware Transmit Overflow

When the kernel 600 tries to transmit packets that are stored in the vmxnet driver's 225 guest transmit pointer queue 1320, it tries to transfer the packets' addresses to the physical transmit pointer queue 1310 of the physical NIC 172. There is no guarantee, however, that there will be room in the physical transmit pointer queue 1310. Whenever the kernel's 600 transmit code (in the implementation module 612) runs, it takes ownership of all of the packets in the vmxnet driver's 272 transmit pointer queue 1320 and then calls the physical NIC 172 in the conventional manner in order to send the packets. For each packet that the physical NIC 172 cannot handle, the kernel 600 puts the packet into a separate overflow queue 1370 for the device so that the packet can be sent when the physical NIC signals the kernel 600 in any conventional manner that space is available in its physical transmit pointer queue 1310. These queued packets (in the overflow queue 1370) will be sent before any other packets are sent.

Receives

The receive path also utilizes the data structures that are shared between the kernel 600 and the vmxnet driver 225 to minimize VMM-to-kernel transitions. Because the kernel 600 can access the guest receive pointer queue1322, received packets can be put into the memory space accessible to the VM 200 without any VMM intervention.

Basic Receive Path

The basic path followed when a packet is received is the following:

1) The kernel 600 determines the virtual NIC(s) 272 for which the packet is intended. (Only one virtual NIC 172 is shown, for the sake of simplicity, but any number may be included in a system that includes the invention, in particular, in a broadcast or multi-cast system.)

2) For each virtual NIC, the kernel 600:
  a) Inspects the guest receive pointer queue 1322 in the memory portion 132 shared with the vmxnet driver 225 to find an empty packet. If there is no empty packet, then the packet is dropped;
  b) The kernel 600 copies the data from the received packet into the guest receive packet data buffer 1323 at the location pointed to by the corresponding entry on the guest receive pointer queue 1322; and
  c) The kernel 600 posts an action to the VMM to tell it to raise a standard receive interrupt to the VM (in particular, to the vmxnet driver 225).

3) On each receive interrupt the guest vmxnet driver 225:
  a) Dismisses the interrupt and, in the case of Windows, blocks future interrupts;
  b) Processes all incoming packets and gives them to the guest OS 220; the receive entries are then made ready again to receive more packets; and
  c) In the case of Windows, enables future interrupts.

Receive Clustering

In the simplest case, an interrupt is raised to the VM 200 for each packet received. The guest driver 225 then needs to do one or two conventional IN/OUT operations to trap to the VMM 300 to deal with the interrupt. The raising of the interrupt is a fairly expensive operation, however, as are the IN/OUT operations themselves. Receive clustering according to the invention reduces this overhead by a factor at least approximately equal to the receive cluster size—only one interrupt is raised per cluster of packets. For example, with a cluster size of ten packets, there will only be one interrupt raised for each group of ten packets.

The idea behind receive clustering according to the invention is that if the VM is receiving enough packets, then they can be delivered in groups—again, clusters—instead of individually. Clustering is turned ON, for example using the routine 613, when the kernel 600 determines that the VM is receiving a sufficient number of packets per second and it is turned OFF when the receive rate gets too low.

Receive clustering according to the invention has a straightforward implementation: When a packet is inserted into the vmxnet driver's 225 receive pointer queue 1322, a count $R_{def}$ is incremented by any conventional routine in the emulation module 360 in the VMM 300. If the count $R_{def}$ exceeds a maximum predetermined number $R_{max}$ of unprocessed received packets, then an interrupt is raised to the VM.

The maximum number $R_{max}$ of unprocessed received packets is a configuration parameter that can be determined using conventional design criteria, and may be made adjustable by a system administrator using known techniques. Note that if the threshold number $R_{max}$ is made too big, then throughput will suffer because the VM will not be able to process the packets fast enough and the sender (in most cases, a remote device communicating via the network 700) will slow down. Lowering the threshold number, however, reduces the benefit of clustering by increasing interrupts to the guest. In a prototype of the invention, for example, the parameter had a default value of ten unprocessed packets ($R_{max}$=10).

Moreover, in the prototype, receive clustering was turned ON if at least 4000 packets were received on average per second, measured over a 30 millisecond interval (120 packets must be received in the interval) and turned OFF if fewer than 3000 packets were received on average per second, measured over a 30 millisecond interval (90 packets must be received in the interval). These numbers were tuned for a 100 Mbit network with relatively slow system hardware but should be adjusted using normal design techniques as new generations of hardware and networking become available.

As in transmit clustering, a timer may be used to handle the case when a receive packet is pending too long: If a packet remains pending in the guest receive pointer queue 1322 for more than a predetermined threshold time, for example, ten milliseconds, without the guest VM being interrupted, then the timer forces the VMM to raise an interrupt to the VM. If the queue size is not too large, then the timer will not have to raise interrupts to the guest very often.

Interrupt Off-Loading

In general, a VM suffers performance degradation relative to a native machine running benchmarks because of emulation overheads, that is, the CPU cycles required to run the emulations. Consequently, the availability of CPU cycles generally is a limiting factor when running benchmarks. In multi-processor systems, transmit and receive clustering according to the invention provides a way to off-load the networking burden to a different CPU.

As mentioned above, in the preferred embodiment of the invention, with transmit clustering, most of the transmits are initiated as a result of a receive interrupt. Similarly, the work of handling a received packet, including copying the data into the guest's receive packet data buffer 1323 is done as a result of a receive interrupt. Using interrupt off-loading according to the invention, the interrupts from the (or one of the) physical NIC(s) 172 are directed to an idle CPU if one is available so that the idle CPU can do all other transmit and receive work. This relieves the CPU currently used to process the instructions relating to the execution of the VM (that is, the CPU on which the VM is running) from the burden of handling networking tasks. This off-loading arrangement will typically give the VM more CPU cycles in which to do other work besides handling these networking tasks.

Both receive and transmit clustering can cause interrupts to be generated for the VM. Interrupts are generated by the kernel 600 for a guest VM by posting an action to the VMM, whose interrupt/exception handler 355 then takes over processing of the interrupt, including forwarding it, if appropriate, to the VM. If the VM is running, then it must be interrupted so that the VMM may check actions. If the interrupt for the physical NIC 172 happens on the same CPU where the VM is running, then processing may proceed as normal. However, if the interrupts are sent to a different CPU, then an IPI (inter-processor interrupt) must be sent to the CPU on which the VM is running.

The general procedure for implementing an IPI is well known: In most existing multi-processor systems some device and/or mechanism is implemented specifically for delivering IPIs. In Intel-based systems, for example, each CPU has an APIC (Advanced Programmable Interrupt Controller), which has a unique ID; the APICs are all connected via a bus. In such systems, the following procedure is followed when a thread on one CPU (the "local" CPU) wants to send an IPI to another CPU (the "destination" CPU"); a similar procedure is followed in systems that have architectures not based on Intel processors.

1) The thread programs the APIC on its local CPU with the APIC ID of the destination and the "vector" to deliver the IPI on. Note that the designation "destination" here does not mean the destination device of the network transfer, but rather the APIC/CPU on which the VMM 300 is executing. In this invention, the thread that programs the local APIC is the kernel 600 and the destination is the APIC/CPU on which the VMM 300 is executing.

2) The local APIC puts a message on the shared APIC bus. This message typically takes the following form: <type=IPI, destination=APIC id, vector=V>.

3) The destination APIC receives the message. It sees from the "type" parameter that the message involves an IPI, so it raises the interrupt line to the destination CPU.

4) The destination CPU senses the interrupt and asks its APIC what the vector is.

5) The destination APIC replies that the vector is V.

6) The destination CPU then calls the interrupt handler stored in the IDT: IDT[V].handler( )

In the IPI context, in systems based on the Intel x86 architecture, the "vector" V is usually only a single byte and must have a value that lies in the range [32, 255]. Each vector V represents an index into the IDT. The IDT has 256 entries. Entries 0-31 are reserved for exceptions. Analogous structures are found in other architectures.

Typically, all interrupts are fielded by the VMM's interrupt/exception handler 355, whereupon the VMM calls the kernel 600 to actually deal with the device or the IPI. It would be preferable, however, to eliminate as many VMM-to-kernel 600 crossings as possible because they are expensive in terms of CPU cycles. To make this as efficient as possible, the invention preferably takes advantage of the IPI procedure outlined above and of the fact that when the kernel sends an IPI it can decide which CPU to send the IPI to and which IPI vector to use. According to this aspect of the invention, the kernel uses the IPI vector V as a "check-action" IPI. The procedure is also illustrated in FIG. 4.

Figure 4:
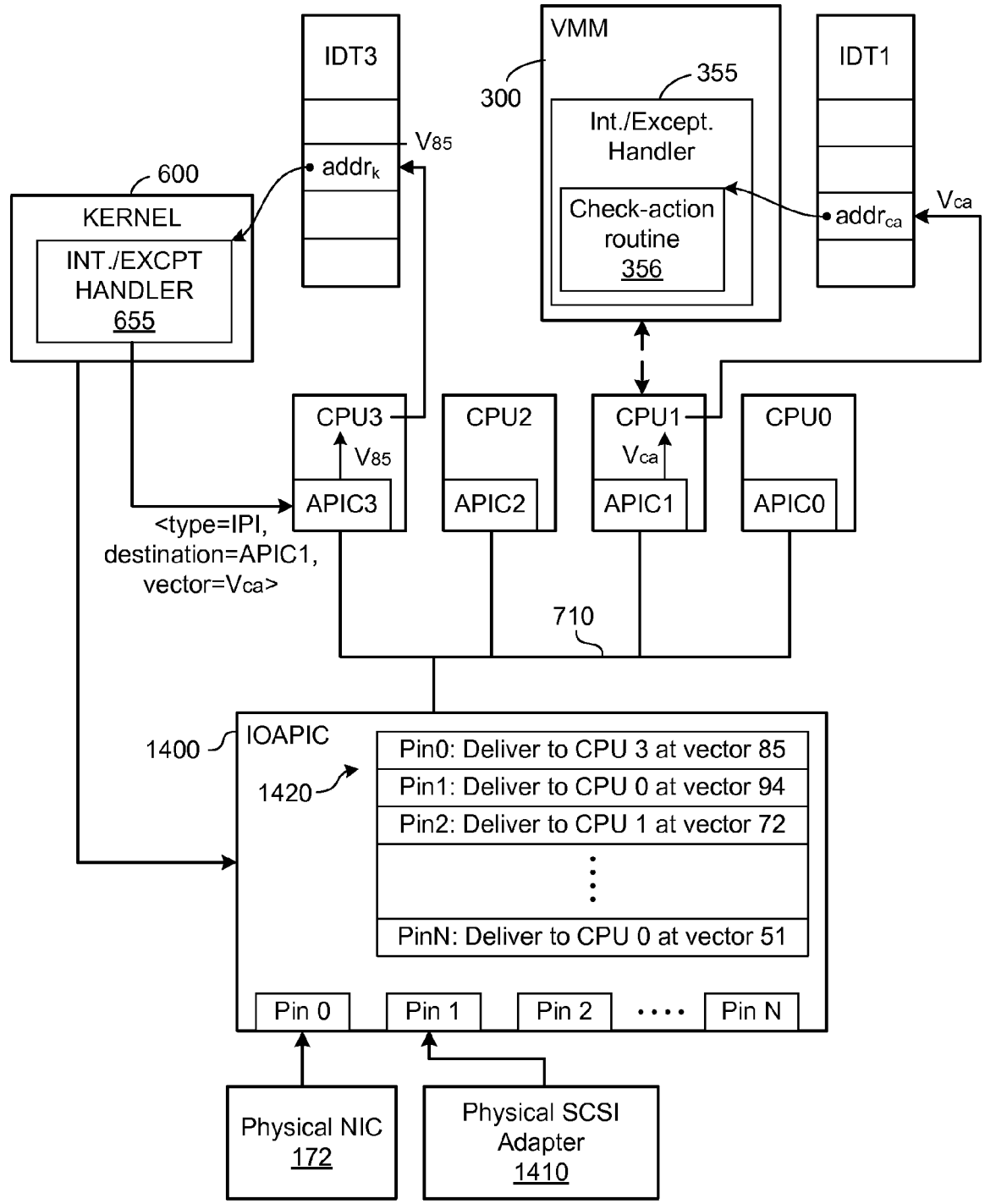
FIG. 4 illustrates interrupt offloading according to the invention.

In FIG. 4, merely by way of example, four CPUs (CPU0-CPU3) are shown, each having its own APIC (APIC0-APIC3, respectively). The APICs are connected to a bus 710.

Further in FIG. 4, the VMM 300 is shown separated from the kernel 600 and running directly on a hardware processor. This is done just for the sake of clarity in describing the different steps involved in interrupt offloading according to the invention. The actual relationship between the VMM and the kernel is shown in the preferred embodiment of the invention is shown in FIG. 2. In this example, the VMM 300 is running on CPU1, which forms the destination CPU.

Typically, each CPU will have a separate IDT. It would also be possible, however, for CPUs to have separate pointers but share a single IDT. The invention may be used in either case. In FIG. 4, separate IDTs—IDT1, IDT3—are shown for CPU1 and CPU3, respectively, other IDTs having been omitted for the sake of simplicity.

As a preliminary step, the kernel 600 configures the hardware interrupt sub-system to send device interrupts (that is, interrupts from some source entity) to a currently idle CPU; in the illustrated example, CPUs CPU0, CPU2, and CPU3 are currently idle (or at least not operating at full capacity), and the kernel selects CPU3 as being the "most idle, using any known criterion. CPU3 therefore becomes the "local" CPU.

In Intel-based systems, the interrupt sub-system comprises at least one IOAPIC (I/O APIC) 1400, which is on the same bus 710 as the APICs APIC0-APIC3. The interrupt lines of all devices are routed to pins of the IOAPIC. In FIG. 4, two devices are shown connected to the IOAPIC 1400—the physical NIC 172, and, by way of another example, a physical SCSI adapter 1410; in general, any number N of devices may be connected to the IOAPIC via a respective pin Pin 0, Pin 1, Pin 2, . . . , Pin N.

For each pin, or at least each pin in use, the kernel programs the IOAPIC using conventional commands to tell it which APIC to send each interrupt to and which vector to use. The IOAPIC therefore includes a table 1420, which is indexed by pin number and whose entries indicate what to do when a given interrupt arises. When a device raises an interrupt, it is fielded by the IOAPIC. The IOAPIC, which knows which pin the interrupt came in on, looks up the information for the interrupt in the table 1420 using the pin number as an index. It then sends a message on the bus 710 to the appropriate APIC telling it that an interrupt has occurred.

In FIG. 4, for example, an interrupt on pin 0 causes the IOAPIC to deliver the interrupt to CPU3 (more specifically, to CPU3's APIC3) at vector 85. CPU3 then takes the vector (shown as V85) provided by the IOAPIC 1400 and with it as an index enters its IDT—IDT3—to get the address $addr_k$, which is the location of the kernel's interrupt/exception handler 655 routine for handling Pin 0 interrupts. The result of this preliminary step is that an interrupt that arrives from the physical NIC 172, for example to acknowledge packet transmission, leads to the kernel's interrupt/exception handler 655 being called at the routine whose entry point is $addr_k$.

As another preliminary step, the VMM 300 and the kernel 600 agree on which vector Vca (the designation "ca" indicating "check action") to use for the check-action IPI. The VMM 300 then puts the address $addr_{ca}$ of its check-action IPI routine 356 in its CPU's IDT—IDT1—indexed by Vca.

Assume now that as part of executing the kernel's interrupt/exception handler 655, the kernel determines that it needs the VMM, which is executing on CPU 1, to check actions. This could happen, for example, if the VM receives a new packet that needs to be processed. The kernel then sends an IPI via the local APIC (here, APIC3), which puts the IPI on the APIC bus 710. This IPI will have the form <type=IPI, destination=APIC1, vector=Vca>. APIC1 will then receive the IPI and pass to CPU1 the vector Vca. CPU1 will then enter IDT1 at index Vca, which will direct it to the address $addr_{ca}$ of the VMM's check action routine 356.

Two advantages of this aspect of the invention should now be clear: First, device interrupts, in particular from the physical NIC 172, may be handled by an idle CPU, even though the interrupt may ultimately require VMM action; the CPU on which the VMM is running does not itself need to handle the device interrupts. Second, the interrupt is passed to the VMM solely using existing hardware structures, with no need for a VMM-to-kernel or kernel-to-VMM state transition. Moreover, if this interrupt off-loading aspect of the invention is included in the system, packets can be received and transmitted without a single VMM-to-kernel crossing.

The interrupt offloading mechanism described above is useful regardless of the need for network operations on behalf of the VM: Regardless of the task that the VM needs done, this aspect of the invention reduces the need to interrupt the VM in order for the VMM to take and handle interrupts, and it also reduces and, in most cases, eliminates the need for a VMM-to-kernel or kernel-to-VMM crossing (world switch) in order to pass an interrupt to the VMM for handling. Note that interrupt offloading according to the invention will work even where the destination CPU is not supporting a VMM/VM, but rather some other software or even hardware entity—regardless of the nature of the entity that ultimately is to receive the interrupt, offloading may be used to relieve the CPU it is running on from the task of handling device interrupts and to enable the kernel to forward interrupts to the entity using hardware mechanisms, with no need for direct calls between the kernel and the entity.

I claim:

1. A method of conveying a data packet received from a network to a virtual machine instantiated on a computer system coupled to the network, the method being implemented by a virtualization kernel component of virtualization software for execution on the computer system, the method comprising:
    inspecting a guest receive pointer queue of a component executing in the virtual machine to identify a location in a guest receive packet data buffer that is available to receive packet data;
    copying data from the data packet received from the network into the guest receive packet data buffer at the location identified in the guest receive pointer queue as being available;
    raising a standard receive interrupt to the virtual machine without any intervention by a virtual machine monitor component of the virtualization software; and
    whereby the kernel causes the data packet received from the network into a memory space accessible to the virtual machine without any intervention by the virtual machine monitor component of the virtualization software.

2. The method of claim 1, wherein the kernel determines that the virtual machine is receiving a threshold number of packets per unit of time and as a result of this determination, enables a clustering mode, the clustering mode causing the raising of the standard receive interrupt to the virtual machine to occur for clusters of packets, thereby delivering packets in groups to the virtual machine.

3. The method of claim 2, wherein:
    the kernel tracks a number of unprocessed data packets received from the network that are directed to the virtual machine; and
    the raising of the standard receive interrupt is performed only when the data packet received from the network causes the number of unprocessed data packets received from the network that are directed to the virtual machine meets or exceeds a second threshold.

4. The method of claim 3, wherein the second threshold is ten.

5. The method of claim 2, wherein the kernel enables clustering when more than 120 packets are received that are directed to the virtual machine within a 120 millisecond interval.

6. The method of claim 1, wherein the guest receive pointer queue is in memory space that is shared by the kernel and a software component of a guest operating system that is executing in the virtual machine.

7. A machine readable non-transitory storage medium embodying program code executable by a microprocessor to implement a method for conveying a data packet received from a network to a virtual machine instantiated on a computer system that includes the microprocessor and which is coupled to the network, the program code forming a portion of a virtualization kernel component of virtualization software executing on the computer system, the method comprising:
  inspecting a guest receive pointer queue of a component executing in the virtual machine to identify a location in a guest receive packet data buffer that is available to receive packet data;
  copying data from the data packet received from the network into the guest receive packet data buffer at the location identified in the guest receive pointer queue as being available; and
  raising a standard receive interrupt to the virtual machine without any intervention by a virtual machine monitor component of the virtualization software, and whereby the kernel causes the data packet received from the network into a memory space accessible to the virtual machine without any intervention by the virtual machine monitor component of the virtualization software.

8. The storage medium of claim 7, wherein the kernel determines that the virtual machine is receiving a threshold number of packets per unit of time and as a result of this determination, enables a clustering mode, the clustering mode causing the raising of the standard receive interrupt to the virtual machine to occur for clusters of packets, thereby delivering packets in groups to the virtual machine.

9. The storage medium of claim 8, wherein:
  the kernel tracks a number of unprocessed data packets received from the network that are directed to the virtual machine; and
  the raising of the standard receive interrupt is performed only when the data packet received from the network causes the number of unprocessed data packets received from the network that are directed to the virtual machine meets or exceeds a second threshold.

10. The storage medium of claim 9, wherein the second threshold is ten.

11. The storage medium of claim 8, wherein the kernel enables clustering when more than 120 packets are received that are directed to the virtual machine within a 120 millisecond interval.

12. The storage medium of claim 7, wherein the guest receive pointer queue is in memory space that is shared by the kernel and a software component of a guest operating system that is executing in the virtual machine.

13. A virtualization system comprising a computer system, virtualization software executing on the computer system, and a virtual machine instantiated on the computer system, the virtualization software including a kernel component implementing a method for conveying a data packet received from a network to the virtual machine, the method comprising:
  inspecting a guest receive pointer queue of a component executing in the virtual machine to identify a location in a guest receive packet data buffer that is available to receive packet data;
  copying data from the data packet received from the network into the guest receive packet data buffer at the location identified in the guest receive pointer queue as being available;
  raising a standard receive interrupt to the virtual machine without any intervention by a virtual machine monitor component of the virtualization software, and whereby the kernel causes the data packet received from the network into a memory space accessible to the virtual machine without any intervention by the virtual machine monitor component of the virtualization software.

14. The virtualization system of claim 1, wherein the kernel component determines that the virtual machine is receiving a threshold number of packets per unit of time and as a result of this determination, enables a clustering mode, the clustering mode causing the raising of the standard receive interrupt to the virtual machine to occur for clusters of packets, thereby delivering packets in groups to the virtual machine.

\* \* \* \* \*